United States Patent
Romano

(10) Patent No.: US 11,064,581 B2
(45) Date of Patent: Jul. 13, 2021

(54) DIMMER SYSTEM CONTROL

(71) Applicant: Shafrir Romano, Rishon Lezion (IL)

(72) Inventor: Shafrir Romano, Rishon Lezion (IL)

(*) Notice: Subject to any disclaimer, the term of this patent is extended or adjusted under 35 U.S.C. 154(b) by 0 days.

(21) Appl. No.: 16/844,363

(22) Filed: Apr. 9, 2020

(65) Prior Publication Data

US 2020/0351995 A1    Nov. 5, 2020

Related U.S. Application Data

(63) Continuation-in-part of application No. 16/398,740, filed on Apr. 30, 2019, now Pat. No. 10,652,986.

(51) Int. Cl.
*H05B 45/10* (2020.01)
*H05B 47/19* (2020.01)
*G06F 3/0484* (2013.01)

(52) U.S. Cl.
CPC .......... *H05B 45/10* (2020.01); *G06F 3/04847* (2013.01); *H05B 47/19* (2020.01)

(58) Field of Classification Search
CPC ........ H05B 45/10; H05B 47/19; H05B 45/20; G06F 3/04847
See application file for complete search history.

(56) References Cited

U.S. PATENT DOCUMENTS

| | | | |
|---|---|---|---|
| 8,009,042 B2* | 8/2011 | Steiner | H05B 47/13 340/541 |
| 2008/0111491 A1 | 5/2008 | Spira | |
| 2015/0137699 A1 | 5/2015 | Killo et al. | |
| 2015/0189721 A1* | 7/2015 | Karc | H05B 47/19 315/250 |

* cited by examiner

*Primary Examiner* — Daniel D Chang
(74) *Attorney, Agent, or Firm* — Emerson, Thomson & Bennett, LLC; Roger D. Emerson

(57) ABSTRACT

A method of automatic LED lamp provisioning in a lighting system comprising a dimmable LED lamp and a dimmer. The method comprises the following steps performed in the lamp: Upon turn-ON, checking a stored listening RF frequency value, which is one of a predefined provisioning frequency F0 and a control frequency Fn which is specific to the dimmer. If the stored listening frequency is F0, listening on F0 during a predefined provisioning waiting period for receiving from the dimmer provisioning information comprising the value of the dimmer specific Fn, and upon receiving the provisioning information, storing the Fn value for listening thereon following the next turn-ON events and varying the listening frequency to Fn for receiving from the dimmer control information thereon. If the stored listening frequency is Fn, listening on Fn for receiving the control information from the dimmer.

7 Claims, 2 Drawing Sheets

DIMMER SYSTEM CONTROL

FIELD OF THE INVENTION

The present invention relates generally to lighting systems, and more particularly to methods and systems that involve provisioning of dimmable LED lamps.

BACKGROUND OF THE INVENTION

Light Emitting Diodes (LEDs) have become a prevailing technology in the industry of lighting. Alongside the market transition to LED lighting, dimming techniques, as well as techniques for controlling the resultant color of multi-color LED arrays, have become well-established in the art. The implementation of these techniques commonly involve wireless communication, which necessitates some provisioning process for associating between the dimmer and the LED lamp.

Regarding this issue, US Patent Application 20080111491 discloses a wireless lighting control system comprises a dimmer switch and a remote control. The dimmer switch is coupled in series between an AC power source and a lighting load and comprises a first actuator and a wireless receiver. The dimmer switch is operable to control the amount of power delivered to the lighting load in response to an actuation of the first actuator or a wireless control signal received by the wireless receiver. The remote control comprises a second actuator and a wireless transmitter operable to transmit the wireless control signal is response to an actuation of the second actuator. The remote control is operable to be associated with the dimmer switch in response to simultaneous actuations of the first and second actuators. Accordingly, the dimmer switch subsequently controls the intensity of the lighting load in response to the wireless control signal transmitted by the remote control. However, the disclosed association technique is not applicable when the LED lamp is already ceiling mounted, which hinders the actuation operation.

US Patent Application 20150137699 discloses a method for associating a first wireless control device with a second wireless control device, the method comprising: receiving, at the second wireless control device, wireless signals from the first wireless control device; measuring a signal strength of each of the wireless signals received by the second wireless control device; determining whether a change has occurred in the signal strength of the wireless signals received by the second wireless control device; and associating the first wireless control device and the second wireless control device when the signal strength of the wireless signals received by the second wireless control device has changed. However, the disclosed association technique is not applicable when both the dimmer and the lamp are stationary.

Another association technique known in the art involves clicking in the controller, or dimmer, the lamp's serial number. However this technique necessitates knowing the lamp's serial number and is not applicable in the case of a dimmer with a simple user interface.

Thus, it would be desirable to provide an automatic method for associating a lamp, typically though not necessarily a dimmable LED lamp, with a typically wall mounted device that serves as an ON/OFF switch as well as wireless based dimmer.

SUMMARY OF THE INVENTION

Accordingly, it is a principal object of the present invention to provide a method of automatic association between a dimmer and a dimmable LED lamp controlled thereby. In typical embodiments, the dimmer is wall mounted and allows users to turn ON/Off and wirelessly control the intensity, and optionally the color, of the light emitted from the lamp. The lamp typically includes one or more LED arrays and is mounted remotely from the dimmer.

Thus, in accordance with an embodiment of the present invention, the disclosed method comprises the following steps, performed in the lamp: Upon turn-ON, checking a stored listening RF frequency value, which is one of a predefined provisioning frequency F0 and a control frequency Fn which is specific to the dimmer. If the stored listening frequency is F0, listening on F0 during a predefined provisioning waiting period for receiving from the dimmer provisioning information comprising the value of the dimmer specific Fn, and upon receiving the provisioning information, storing the Fn value for listening thereon following the next turn-ON events and varying the listening frequency to Fn for receiving from the dimmer control information thereon. If the stored listening frequency is Fn, listening on Fn for receiving the control information from the dimmer.

In some embodiments, the disclosed method further comprises the step of limiting the time of listening on Fn after turn-ON until receiving the first control information from the dimmer to a predetermined control waiting period, and determining the stored listening frequency as F0 during the control waiting period so as to ensure listening on F0 after the next turn-ON if the lamp is turned OFF during the control waiting period. In some of these embodiments, the control waiting period is substantially longer than the provisioning waiting period. In some of these embodiments the control waiting period is actually not limited.

In some embodiments, the above method further comprises sending to the dimmer an acknowledgement upon receiving the provisioning information, and conditioning the transition of the dimmer transmit frequency from F0 to Fn on receiving the acknowledgement in the dimmer.

In some embodiments, the provisioning information also comprises a dimmer unique ID (DID), and the method further comprises storing the DID, typically in a non-volatile memory in the lamp, and henceforth recognizing only control information containing the DID, so as to discard other dimmers' communication on Fn.

In some embodiments, the provisioning information may be associated control information.

In accordance with an embodiment of the present invention, there is also provided a control circuit in a dimmable LED lamp, wherein the lamp is powered and wirelessly controlled by a dimmer. The control circuit comprises a wireless adapter configured to receive from the dimmer provisioning and control information. The control circuit also comprises a controller coupled to receive the provisioning and control information from the wireless adapter for controlling the LED lighting according to the control information and for recognizing the specific dimmer that powers and controls the lamp by performing the disclosed above method.

In accordance with an embodiment of the present invention, there is also provided a dimmer comprising: An AC line switch for turning ON/OFF and powering a LED lamp through a wire connection. A user interface (UI) configured to allow a user of the dimmer to activate the AC line switch for turning ON/OFF the lamp, and to control one or more properties of the LED light. A controller coupled to the UI for receiving therefrom the user control. Finally, the dimmer includes a wireless adapter coupled to the controller to receive therefrom and to send to the lamp control information based on the user control, and provisioning information for allowing the lamp to distinguish the control information transmitted by the attached dimmer from control information transmitted by other dimmers in the vicinity of the lamp, wherein the controller is configured to perform the following: (a) After turning ON the lamp, wirelessly transmitting thereto, on a predefined provisioning RF frequency F0, provisioning information comprising the value of an RF frequency Fn that is preselected as the dimmer specific frequency for controlling the lamp. (b) Varying the wireless transmit frequency from F0 to Fn for sending thereon the control information to the lamp.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Embodiments of the present invention provide dimmer based lighting systems that employ an automatic provisioning method. This means that in a newly installed lighting system, there is no need for a user involved association process between the dimmer and the one or more dimmable lamps that it feeds and controls. The association is achieved by means of a provisioning process that takes place when the user turns on the lamp, or lamps. In a typical embodiment, a wall mounted dimmer is wire connected to a ceiling or wall mounted dimmable lamp. The following description relates to LED based lighting systems, however the disclosed techniques may be applied to other lighting technologies as well.

Figure 1:
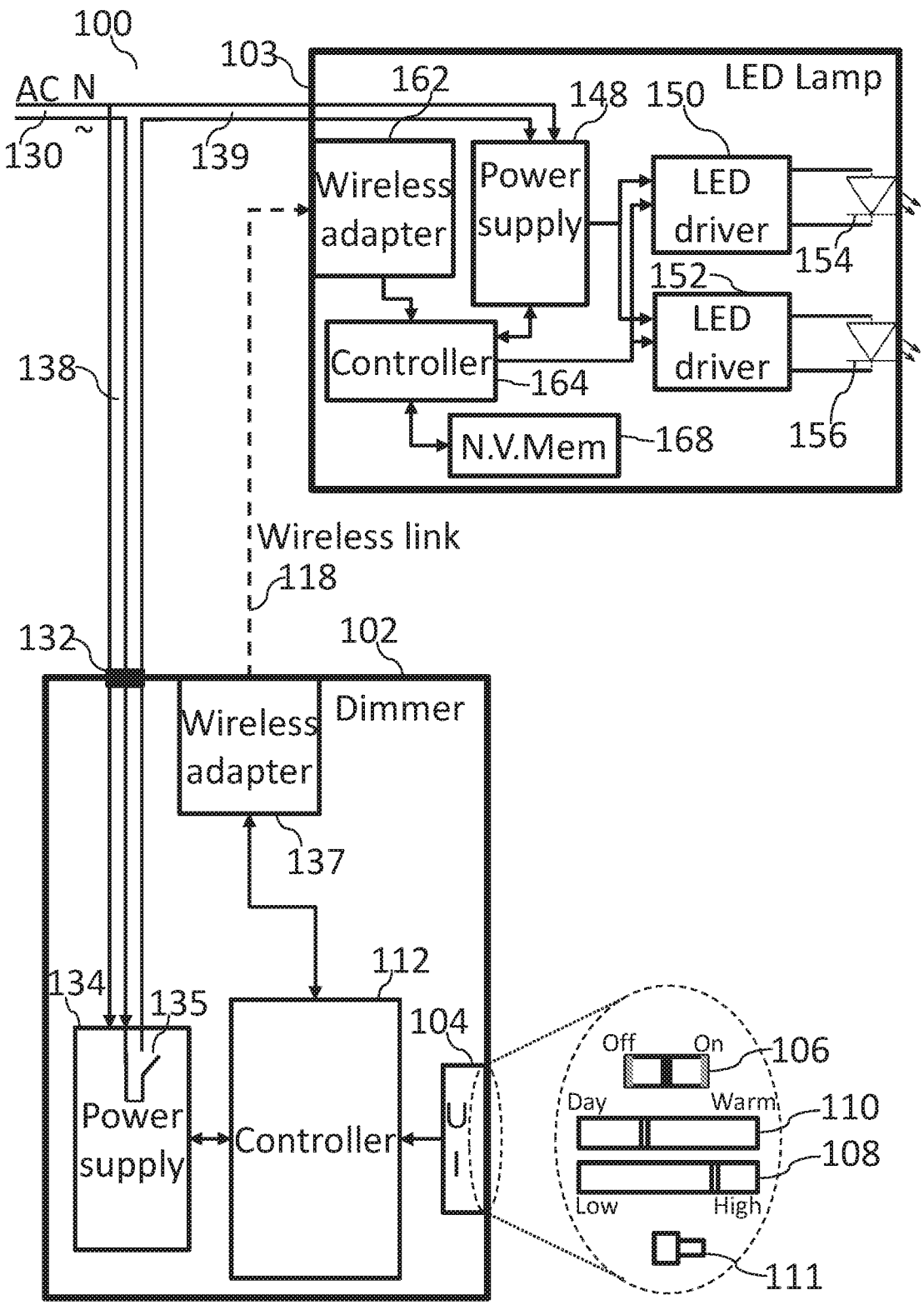
FIG. 1 is a block diagram that schematically illustrates a dimmer system, in accordance with an embodiment of the present invention.

Referring to FIG. 1, there is shown a block diagram of a lighting system 100, in accordance with an embodiment of the present invention. In the figure, a dimmer 102 is connected to a dimmable LED lamp 103 as explained below. Dimmer 102 comprises a User interface (UI) 104 comprising sliders 108 and 110 for continuous respective adjustments of the intensity and the color temperature of the light emitted from lamp 103. UI 104 also includes an OFF/ON selector or push button 106 for switching an AC line going to lamp 103 as explained below. In some embodiments user ON/OFF control 106 may also be embedded in slider 108. In some embodiments, UI 104 includes only light intensity and ON/OFF user controls. In an embodiment UI 104 also includes an provisioning push button 111, which will be explained hereinafter with reference to FIG. 2. UI 104 transfers electric signals, which reflect the user's control of lamp 103, to a controller 112. In some embodiments the controls in UI 104 include touch technology.

Controller 112 reads from UI 104 the user control values relevant to the specific embodiment and generates therefrom provisioning and control information that it transfers in appropriate messages to lamp 103 through a wireless adapter 137. The wireless communication between dimmer 102 and lamp 103 is illustrated in FIG. 1 as a wireless link 118. In a typical embodiment, an RF frequency in the range from 0.5 GHz to a few GHz is employed in wireless link 118.

Controller 112 also transfers the ON/OFF user control from UI 104 to a power supply (PS) 134 to affect an AC line ON/OFF switch 135 attached to PS 134. In typical embodiments, switch 135 is implemented by a mechanical relay, however the more general term switch is used in the present description. In some embodiments the user ON/OFF action affects switch 135 through a direct connection between UI 104 and PS 134. When user control 106 is in ON position, switch 135 is closed and Dimmer 102 is deemed to be in ON state. PS 134 is fed by an AC supply line 130 through a wire connection 138 and an AC line input port 132. Port 132 also constitutes a switched AC line output port that leads switched AC line voltage to lamp 103 through wire connection 138. Lamp 103 is fed through a switched wire connection 139, in which at least the phase line is switched by switch 135 and passes through port 132 and wire connection 138.

Lamp 103 comprises a PS 148 that is fed through wire connection 139 as explained above. PS 148 powers two LED drivers 150 and 152 that drive respective two closely spaced LED arrays 154 and 156 each having a different color temperature. The driving power and consequently the intensity of light emitted from each LED array is determined by a controller 164 that controls LED drivers 150 and 152 based on dimming messages that it receives from controller 112 through a wireless adapter 162. In some embodiments lamp 103 includes only one LED array and driver, while in other embodiments it includes more than two thereof. Controller 164 write and read from a non-volatile memory 168 as explained hereinafter with reference to FIG. 2.

The wireless communication between wireless adapters 137 and 162 may pass through a mediation station not shown in FIG. 1. In embodiments of the present invention, the employed wireless technology may be of various types and communication protocols such as Bluetooth, ZigBee, Wi-Fi and any proprietary type and protocol. In some embodiments system 100 comprises additional dimmable lamps such as 103, not shown in FIG. 1, which are also fed through switched AC line 139 and controlled through wireless link 118. In one embodiment any of controllers 112 and 164 comprises a general purpose processor which runs software for carrying out the functions described above. However, any other suitable control means can be used alternatively or additively such as ASICs and FPGAs.

The above description has focused on the specific elements of lighting system 100 that are essential for understanding certain features of the disclosed techniques. Conventional elements and connectivity that are not needed for this understanding have been omitted from FIG. 1 for the sake of simplicity, but will be apparent to persons of ordinary skill in the art. The configuration shown in FIG. 1 is an example configuration, which was chosen purely for the sake of conceptual clarity. In alternative embodiments, any other suitable configurations can also be used.

Figure 2:
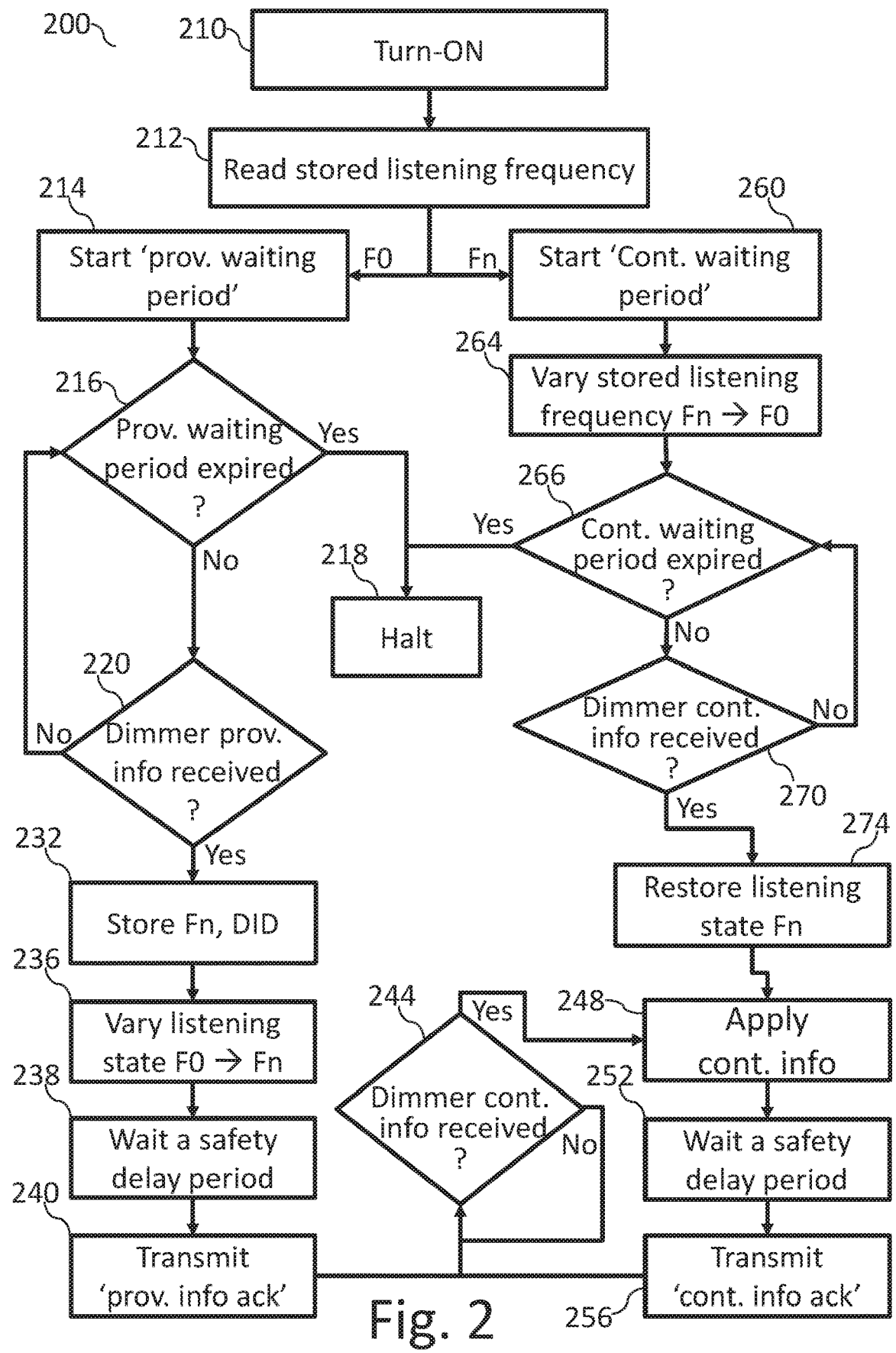
FIG. 2 is a flowchart that schematically illustrates a method of automatic LED lamp provisioning in a dimmer system, in accordance with an embodiment of the present invention.

Referring now to FIG. 2, there is shown a flowchart 200 which schematically illustrates a method of automatic lamp provisioning in a dimmer system such as system 100, in accordance with an embodiment of the present invention. The described method steps relate to lamp 103, however their relation to dimmer 102 should be apparent from the context. Flowchart 200 begins with a turn-ON step 208, in which, due to user turn-ON operation on button 106, ON/OFF switch 135 provides AC line voltage through AC lines 138 and 139 to PS 148 in lamp 103. Upon turn-ON, controller 164 reads from memory 168, in a reading step 212, a listening frequency stored therein. The listening frequency can be either F0 or Fn.

Stored frequency F0 indicates that lamp 103 is ready for a recognition process with dimmer 102 that is wirely attached thereto. This frequency is called 'Provisioning frequency' denoted as F0; the recognition process is called 'Provisioning' and is performed by controller 164 according to the left part of flowchart 200 that descends from method step 212. F0 is always the frequency stored in a new lamp.

Stored frequency Fn indicates that lamp 103 has already recognized the specific dimmer 102 that is wirely attached thereto. This frequency is called 'Control frequency', denoted as Fn, since in this frequency lamp 103 is configured to wirelessly receive and process lighting control information, in particular dimming related messages. When the stored frequency is Fn, controller 164 controls lamp 103 according to the right part of flowchart 200 that descends from method step 212.

If the stored frequency read in step 212 is F0, flowchart 200 proceeds leftward to a starting step 214, in which controller 164 starts a provisioning waiting period. During this period controller 164 waits, in a waiting step 216, for receiving wirelessly from controller 112 dimmer provisioning information in an appropriate message containing at least the Fn value of dimmer 102. In some embodiments the provisioning information also contains an ID of dimmer 102 (DID). Fn allows controller 164 to distinguish dimmer 102 from other dimmers that may transmit control information in the vicinity of lamp 103. The DID of dimmer 102 allows controller 164 to discard control information that dimmer not attached to lamp 103 may transmit on Fn, since Fn may be not a dimmer unique frequency. Controller 112 may also associate lighting control information with the provisioning information. The provisioning waiting period is determined as short as possible so as to minimize the probability of false provisioning, i.e. lamp association with a dimmer that is not wire attached thereto, while still ensuring reliable reception of the dimmer provisioning information from dimmer 102. A provisioning waiting period of several tenths of a second is implemented in typical embodiments, however shorter and longer periods may also be employed.

If the provisioning waiting period expires before controller 164 receives provisioning information from controller 112, controller 164 goes to a halt state in step 218, which will elapse only following the next turn-ON event. If controller 164 receives provisioning information from controller 112 before the provisioning waiting period expiry, flowchart 200 proceeds from step 220 to a storing step 232. In some embodiments, dimmer 102 always starts transmitting provisioning information on F0 after turning lamp 103 ON, and then switches to Fn for transmitting control information. In other embodiments, dimmer 102 starts transmitting provisioning information on F0 after turning lamp 103 ON on the following situations:
  (a) In its first use, by detecting user's first turn-ON action.
  (b) When controller 112 detects that the provisioning button 111 has been activated by the user prior the user's turn-ON action.
  (c) When controller 112 detects that the user has repeated turn ON action during a preconfigured repetition period, typically of a few seconds. Such situation would typically occur when the user of dimmer 102 fails to control lamps 103 due to provisioning failure or false provisioning.

In step 232 controller 164 stores Fn value in memory 168 for the next turn-ON event. In step 236 controller 164 varies the listening frequency of wireless adapter 162 to Fn so as to receive control information, packed in appropriate messages, from dimmer 102. In some embodiments, controller 164, in step 240, acknowledges controller 112 on receiving the provisioning information. In these embodiments, controller 164 typically delays the acknowledgement message of step 240 by a random delay, which is shown in step 238, so as to minimize collision probability in case of a plurality of lamps powered and controlled by dimmer 102. Next, in a waiting step 244, controller 164 waits for control information from dimmer 102. Upon receiving control information controller 164 applies it to drivers 150 and 152 in step 248 and returns to step 244. In some embodiments controller 164 acknowledges controller 112 on receiving the control information, typically after a random delay, as shown in steps 252 and 256.

Back to step 212, if the stored listening frequency is Fn, flowchart 200 proceeds to step 260 in which controller 164 starts a 'Control waiting period'. In some embodiments this period is actually unlimited. In some other embodiment its typical duration is a few seconds, i.e. substantially longer than the provisioning waiting period. Controller 164 then, in step 264, changes the stored listening frequency to F0 while still retaining the actual listening frequency Fn. Steps 266 and 270 relate to the conduct of controller 164 during the Control waiting period. Flowchart 200 exits from these steps upon the following conditions:
  (a) Upon Control waiting period expiry controller 164 halts, in step 218. The incentive of this halt is avoiding false provisioning on another dimmer in the vicinity of lamp 103 since Fn may not be utterly unique. Upon the next turn-ON event, flowchart 200 would turn to step 214 since F0 frequency that has been stored in memory 168 in step 264.
  (b) When lamp 103 is turned OFF. This obvious step is not shown in FIG. 2.
  (c) If controller 164 receives control information from dimmer 102 on Fn before the termination of the control waiting period, in step 274 it restores frequency Fn for the next turn-ON event, and proceeds to already discusses above step 248.

Flowchart 200 is an example flowchart, which was chosen purely for the sake of conceptual clarity. In alternative embodiments, any other suitable flowchart can also be used for illustrating the disclosed method. Method steps that are not mandatory for understanding the disclosed techniques were omitted from FIG. 2 for the sake of simplicity.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method of automatic LED lamp provisioning in a lighting system, wherein the lighting system comprises a dimmable LED lamp and a dimmer configured to power the lamp and to control the lamp light through a wireless link, the method comprising the following steps performed in the lamp:
  upon turning ON, checking a stored listening frequency, which may be one of F0 and Fn, wherein F0 is a preconfigured provisioning RF frequency F0, and Fn is the dimmer specific control RF frequency Fn;
  if the stored listening frequency is F0, listening on F0 during a predefined provisioning waiting period for receiving from the dimmer provisioning information comprising the value of Fn; and upon receiving the provisioning information, storing the Fn value and correspondingly varying the listening frequency to Fn for henceforth receiving the control information from the dimmer on Fn; and if the stored listening frequency is Fn, listening on Fn for receiving the control information from the dimmer.

2. The method of claim 1, further comprising the step of limiting the time of listening on Fn after turn-ON until receiving the first control information to a predetermined control waiting period, and determining the stored listening frequency as F0 during the control waiting period so as to ensure listening on F0 after the next turn-ON if the lamp is turned OFF during the control waiting period.

3. The method of claim 2, wherein the control waiting period is substantially longer than the provisioning waiting period.

4. The method of claim 1, further comprising sending to the dimmer an acknowledgement upon receiving the provisioning information, and conditioning the transition of the dimmer transmit frequency from F0 to Fn on receiving the acknowledgement in the dimmer.

5. The method of claim 1, wherein the provisioning information also comprises a dimmer unique ID (DID), and the method further comprises storing the DID, and henceforth discarding dimmers' communication on Fn not containing the stored DID.

6. The method of claim 1, further comprising receiving from the dimmer during the provisioning waiting period also control information associated with the provisioning information.

7. A control circuit in a dimmable LED lamp, wherein the lamp is powered and wirelessly controlled by an attached dimmer, the control circuit comprising:

a wireless adapter configured to receive from the dimmer provisioning and control information;

a controller coupled to receive the provisioning and control information from the wireless adapter, and configured to interpret and react to the received information by performing the method steps of claim 1.

* * * * *